No. 886,510. PATENTED MAY 5, 1908.
G. P. HUGUET.
HOLDER FOR CORN AND THE LIKE.
APPLICATION FILED JULY 11, 1907.
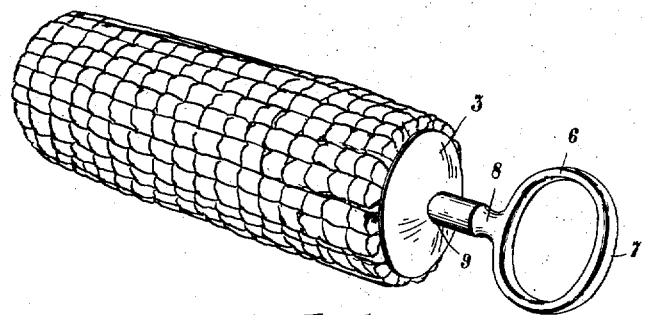
Fig. 1.
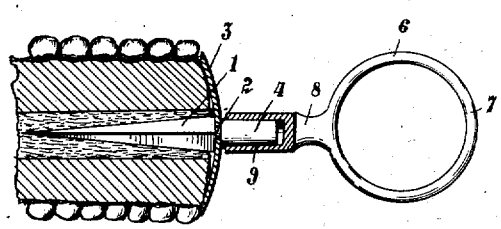 
Fig. 2. Fig. 6.
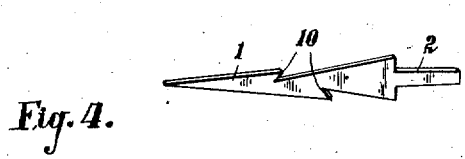 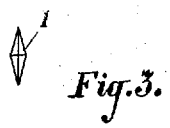
Fig. 4. Fig. 3.
Fig. 5.
Witnesses.
Lloyd Blackmore
P. Shee
Inventor.
G. P. Huguet
by J. J. Gutherintonhaugh Atty.

UNITED STATES PATENT OFFICE.

GEORGE PAUL HUGUET, OF OTTAWA, ONTARIO, CANADA.

HOLDER FOR CORN AND THE LIKE.

No. 886,510.  Specification of Letters Patent.  Patented May 5, 1908.

Application filed July 11, 1907. Serial No. 383,358.

*To all whom it may concern:*

Be it known that I, GEORGE PAUL HUGUET, a subject of the King of Great Britain, residing at the city of Ottawa, in the county of Carleton, Province of Ontario, and Dominion of Canada, have invented certain new and useful Improvements in Holders for Corn and the Like, of which the following is a specification.

The invention relates to improvements in holders for corn and the like, and the object of the invention is to devise a means of holding a cob of corn comfortably in the hand during the process of eating from the cob and arranged in parts so that the said holder may be inserted previous to the serving of the corn without inconveniencing the user, and it consists essentially of the novel construction and arrangement of parts whereby two members, one adapted to be inserted in the corn and the other a handle, are arranged in separate parts and adapted to be joined when in use, the preferable form of the invention being described in detail in the present specification and shown in the accompanying drawings that form part of the same.

In the drawings, Figure 1 is a perspective view of the holder having the handle joined to the sticker portion, and inserted in one end of a cob of corn. Fig. 2 is a sectional view of a portion of the cob of corn showing the sticker inserted therein and the handle joined thereto and partially in section. Fig. 3 is an end view of the sticker. Fig. 4 is a perspective view showing a modified form of sticker. Fig. 5 is a perspective view of the modified form of handle. Fig. 6 is a detailed view of the hilt.

Like numerals of reference indicate corresponding parts in each figure.

Referring to the drawings, 1 is the sticker member adapted to be inserted into the corn and is here shown as a sword shaped lance and 2 is the reduced end extending from said lance portion. 3 is a guard having a central orifice, through which said reduced end extends, the said guard abutting the shoulder formed between said lance portion 1 and said reduced portion 2. 4 is a hilt having a central and longitudinally arranged hole thereinto from its inner end, corresponding to the said reduced end 2 and tapering from the inner end to the outer end. The hilt 4 is inserted over the said reduced end 2, said hilt being firmly secured thereon in any suitable manner over said guard.

6 is a handle made in any suitable shape and shown in Figs. 1 and 2 in the form of a ring 7 having a shank 8 extending therefrom and a tapered socket 9 extending from said shank, said tapered socket 9 being adapted to engage the hilt 4 during the use of said holder. The handle may all be made, if desirable, of some heat non-conducting material, but this is not essential to the invention, for a lining of such material may be placed in the socket 9 or any suitable arrangement to prevent heat passing from the lance portion to the handle.

In Fig. 4 the lance point is shown with the barbs 10 and in Fig. 5 a different form of handle is shown.

It must be understood that other forms of joints may be arranged than that illustrated herein and also the handle may be made in many different shapes to suit the various uses, also that the holder may be used for holding other vegetables and fruits and need not necessarily be confined to the one use of holding a cob of corn.

What I claim as my invention is:—

1. A holder for corn and the like, comprising a sword shaped lance portion and a reduced portion extending therefrom, a guard abutting the shoulder formed at the inner end of said lance portion and a hilt inserted over said reduced end, and a separable handle having a socket engaging said hilt, substantially as described.

2. A holder for corn and the like, comprising a sword shaped lance portion and a reduced portion extending from the inner end of said lance portion, a tapered hilt inserted over said reduced portion and a separable handle having a tapered socket corresponding to and fitting over said hilt, substantially as described.

Signed at Ottawa, this 4th day of July, 1907.

GEORGE PAUL HUGUET.

In the presence of—
W. T. CUFFE-QUIN,
C. BENNETT.